(12) United States Patent
Nielsen (10) Patent No.: US 8,866,323 B2
(45) Date of Patent: Oct. 21, 2014

(54) METHOD AND ARRANGEMENT FOR RESPONDING TO A GRID EVENT, SUCH AS FAST UNDER FREQUENCY COMBINING DEMAND RESPONSE, INERTIAL RESPONSE AND SPINNING RESERVE

(71) Applicant: Kaj Skov Nielsen, Issaquah, WA (US)

(72) Inventor: Kaj Skov Nielsen, Issaquah, WA (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/917,919

(22) Filed: Jun. 14, 2013

(65) Prior Publication Data

US 2014/0001758 A1 Jan. 2, 2014

(51) Int. Cl.
F03D 9/00 (2006.01)

(52) U.S. Cl.
USPC ............................................. 290/44; 700/287

(58) Field of Classification Search
USPC ...................................... 290/43, 44; 700/287
See application file for complete search history.

(56) References Cited

U.S. PATENT DOCUMENTS

| 8,000,840 B2 * | 8/2011 | Nielsen ......................... 700/286 |
| 8,694,173 B2 * | 4/2014 | Lovmand et al. ............. 700/287 |
| 8,704,392 B2 * | 4/2014 | Bager et al. ...................... 290/44 |
| 8,718,832 B2 * | 5/2014 | Hashimoto et al. ........... 700/287 |
| 2011/0175355 A1 | 7/2011 | Rosenvard |
| 2012/0104755 A1 | 5/2012 | Hashimoto |

FOREIGN PATENT DOCUMENTS

| EP | 2270332 A1 | 1/2011 |
| EP | 2458205 A1 | 5/2012 |

* cited by examiner

*Primary Examiner* — Nicholas Ponomarenko (57) ABSTRACT

A method for controlling a wind power plant in case of a frequency drop in a utility grid to which the wind turbines are connected is provided. The method includes combining demand response, inertial response and spinning reserve for given wind speeds in order for wind power plants to deliver fast aggregate under frequency response for a wide wind speed range with minimal recovery time and minimal production loss at each wind speed.

17 Claims, 5 Drawing Sheets

METHOD AND ARRANGEMENT FOR RESPONDING TO A GRID EVENT, SUCH AS FAST UNDER FREQUENCY COMBINING DEMAND RESPONSE, INERTIAL RESPONSE AND SPINNING RESERVE

CROSS REFERENCE TO RELATED APPLICATIONS

The present application claims priority to European Patent Office application No. 12174111.0 EP filed Jun. 28, 2012, the entire content of which is hereby incorporated herein by reference.

FIELD OF INVENTION

The present invention relates to a method and to an arrangement for controlling a energy producing turbine, such as a tidal turbine or a wind turbine, in particular in case of a frequency drop in a utility grid to which the wind turbine is connected, in order to increase a stability of a of the utility grid, the wind turbine can be configured to provide fast frequency response or inertial response but at the same time minimizing the recovery time of the wind turbine to resume normal operations at an acceptable level after the inertial response.

RELATED PRIOR ART

During a low frequency event, such as when the frequency of the grid falls below a nominal frequency, a conventional wind turbine may perform an inertial response function for contributing to the grid stability. Thereby, the inertial response function may pull or extract kinetic energy from the turbine rotor, thereby decreasing the rotational speed of the rotor. Thereby, the conversion efficiency of the rotor may be degraded and further a delay is involved before the full production level can be restored at the nominal rotational speed of the rotor.

It has been observed that the conventional method involves problems of the operation of the wind turbine, in particular regarding the recovery to the normal operation.

There may be a need for a method and for an arrangement for controlling a wind turbine which is connected to a utility grid, in particular in case of a frequency drop in the utility grid, wherein a recovery time of the wind turbine is reduced compared to a conventional method.

Further, there may be a need for a method and for an arrangement for controlling a wind turbine, wherein grid stability may be improved, in particular in case of a frequency drop in the utility grid, without deteriorating the operation of the wind turbine in an excessive manner.

Further, there may be a need for a method and for an arrangement for controlling a wind turbine, wherein a larger reliable synthetic inertial response can be provided with a minimized amount of spinning reserve.

SUMMARY OF THE INVENTION

According to an embodiment of the present invention it is provided a method for controlling a wind power plant, in particular wind turbine power plant, in particular in case of a frequency drop in a utility grid to which the wind turbines are connected, the method comprising: increasing power extraction from a rotating rotor of the wind turbine; and simultaneously decreasing a power demand of the wind turbine, in particular from the utility grid, in particular from a nominal power demand, thereby increasing a net power output of the wind turbine to the utility grid.

Increasing the power extraction may result, in particular at a low wind speed, decreasing a rotational speed of the rotor, in particular from a nominal rotational speed. At high wind speed the rotational speed of the rotor may stay the same but the blade pitch angle may be changed to extract more energy. In the latter case, there may be no recovery time.

The method combines an inertial response with a demand response in order to contribute to utility grid stability in a more effective way.

Further demand response, inertial response and spinning reserve may be combined for the largest possible operating range in order to contribute to grid frequency stability with the least amount of wind power production loss.

In particular, a range of wind speed at which the method may be applied, may be expanded compared to a conventional method, in order to cover 0 m/s to about 40 m/s and the proposed method may be applied for all hours of the year instead of just during periods with wind speeds high enough for active power production.

The wind turbine may comprise a rotor to which one or more wind turbines rotor blades are connected, wherein the rotor drives an electric generator, such as a synchronous generator having an outer rotor with plural permanent magnets. The generator may provide a variable frequency AC power stream to a converter, in particular an AC-DC-AC converter which converts the variable frequency AC power stream to a fixed frequency AC power stream which is then provided to the utility grid in order to provide plural consumers with electric energy.

The converter may be controlled by a respective control signal in order to adjust a torque which the generator exerts on the rotor. Thereby, power extraction from the rotating rotor may be adjusted, in particular increased by increasing the torque exerted by the generator acting on the rotor. Thereby, the rotor may be decelerated such as to assume a rotational speed lower than the nominal rotational speed. The nominal rotational speed may also be referred to as rated rotational speed corresponding to a rotational speed the rotor is designed and constructed to run at the given wind speed. The rotational speed of the rotor may also be represented by a rotational speed of the generator.

Power extraction may refer to an extraction of active power and/or extraction of reactive power. In particular, the active power extraction may be increased in case of a frequency drop in the utility However, increasing the power extraction and/or decreasing the power demand may be initiated by a particular command from a controller such as a park pilot which may not necessarily require a frequency drop or voltage drop in the utility grid.

The main purpose of the control method is for frequency response.

The wind turbine may comprise one or more electrical wind turbine components which may require electrical energy during the normal operation of the wind turbine. However, some of these electrical wind turbine components may not in all situations require the supply of electric energy or supply of a maximal amount of energy. In particular, some of these electrical wind turbine components may be switched off for a certain time period or may at least run with decreased power demand for a certain time period without hampering operation of the wind turbine. Thereby, the power demand of the wind turbine may be decreased thus effectively contributing to the increased net power output of the wind turbine. The net power output of the wind turbine may be the total power extracted from the rotating rotor or total power output by the converter diminished by the power demand of the wind turbine in order to supply electric energy to the electrical wind turbine components.

By combining the increasing of the power extraction and the decreasing the power demand the utility grid may be stabilized, in particular regarding a desired frequency, while the operation of the wind turbine may not be disturbed in an excessive manner such that in particular the wind turbine may resume a nominal or normal operation after a relatively short recovery time.

Thereby, in particular, the relative portion of the increased power extraction and the decreased power demand may be adjusted in order to achieve a net power output increase of the wind turbine.

According to an exemplary embodiment the power demand may be decreased such as to contribute about 5% to 10% of the actual power output, but this portion may vary. At 1 kW production for example, a demand reduction of 5 kW may be much higher than 10% of the 1 kW production. But at nominal production the demand reduction may only be 1% of the total turbine output. Thus, this level may depend on the actual turbine production level.

According to an exemplary embodiment the increase of the power extraction from the rotating rotor may contribute between about 5% and 10% of the production level.

According to an embodiment of the present invention the method further comprises receiving a command to increase the net power output of the wind turbine by a required amount; determining that a maximal decrease of the power demand is smaller than the required amount; decreasing the power demand of the wind turbine, in particular from the utility grid, by the maximal decrease of the power demand; and increasing the power extraction from the rotating rotor such that the required amount equals the increased net power output.

The command may comprise one or more electrical and/or optical signal, i.e. supplied from a park controller. The command may be triggered by a frequency drop in the utility grid and/or by strategic considerations. The required amount may specify the amount of active power which is to be additionally supplied to the utility grid.

The maximal decrease of the power demand may represent an active power or energy which may maximally be saved by switching off or at least turning down one or more electrical wind turbine components without effecting the wind turbine operation in an excessive way so that the wind turbine may still operate in a productive manner, in particular for at least for a particular time period.

According to this embodiment first, the capacity of the reduction of the power demand is exploited in order to keep the rotational speed of the rotor as long as possible at its nominal value. Only the remaining energy or power which is demanded by the command is then supplied by increasing the power extraction from the rotating rotor. Thereby, the rotational speed of the rotating rotor is only decreased to an essentially required amount so that the recovery time may be relatively short or may be minimized.

Thereby, the normal operation of the wind turbine may be resumed in a fast time, thereby improving the efficiency of the power production.

According to an embodiment of the present invention increasing the power extraction from the rotating rotor results in decreasing the rotational speed of the rotor from a nominal rotational speed to a rotational speed lower than the nominal rotational speed.

The rotational speed is decreased from the nominal rotational speed, whereby the efficiency of the wind turbine may decrease. However, since the decreasing of the rotational speed is relatively small the recovery may be achieved in a short time period.

According to an embodiment of the present invention the method further comprises operating the wind turbine at a first wind speed range, in particular between 5 m/s and 12 m/s, or at a second wind speed range, in particular between 23 m/s and 30 m/s, extracting power from the rotating rotor to an amount being 5% to 10% below an available power extraction, in particular rated power extraction (in order to provide a spinning reserve); receiving a command to increase the net power output of the wind turbine by a required amount in the event of a frequency drop; determining that a maximal decrease of the power demand is smaller than the required amount; decreasing the power demand of the wind turbine from the utility grid by the maximal decrease of the power demand; and increasing the extracting the power from the rotating rotor such that the required amount equals the increased net power output.

According to this exemplary embodiment a spinning reserve is maintained by not extracting the available power from the rotor in a particular wind speed range but only extracting a power which may be between 5% and 20% below a available power extraction, thereby providing a spinning reserve which may then later on be exploited to temporarily extract more energy from the rotating rotor. Again it is determined that by exclusively decreasing the power demand the required amount of the increase of the net power output can not be provided. Then, the maximal decrease of the power demand is effected (for example by switching off some of selected electrical wind turbine components or decreasing their required energy or power). Only the rest of the required amount of the increase of the net power output is then provided by extracting some kinetic power of the rotating rotor. Again, thereby the rotational speed of the rotating rotor may be decreased only slightly below the nominal speed such as the recovery time is relatively short.

According to an embodiment of the present invention demand reduction capacity information indicative of the maximal decrease of the power demand for at least one operational condition, in particular for different external conditions, is accessed and is processed for controlling the wind turbine.

The demand reduction capacity information may comprise information about the maximal decrease of the power demand (of one or more electrical wind turbine components), in particular for different wind conditions, different grid states, different external conditions, such as temperature, humidity etc. Depending on the external conditions one or more wind turbine components may be dispensed with or they may be operated with reduced power consumption. Thereby, the method may be improved.

According to an embodiment of the present invention inertial capacity information indicative of a maximal increase of power extraction, in particular between 5% and 10% of an actual power extraction, from the rotating rotor for at least one operational condition, in particular for different external conditions, is accessed and is processed for controlling the wind turbine.

The inertial capacity information may comprise information about the maximal increase of the power extraction from the rotating rotor which may depend on for example a rotational speed, a wind speed, mechanical specifications or the rotor components and so forth. For example, a maximal torque exerted at the rotor may be limited due to the mechanical constitution of the rotor and/or bearing and/or other components of the drive train. Thereby, for each of the operational conditions, in particular plural different external conditions, an optimum amount of the increase of the power extraction may be determined.

Thereby, the method may further be improved.

According to an embodiment of the present invention recovery time information about a recovery time to recover from a current rotational speed to the nominal rotational speed, in particular for at least one operation condition, is accessed and is processed for controlling the wind turbine.

The recovery time information may comprise information about the time to recover from the current rotational speed to the nominal rotational speed for different rotational speeds, i.e. current rotational speeds, for different wind speeds, rotor blade pitch angles, wind speeds, etc. This recovery time information may be very useful, in order to choose the increase of the power extraction and the decrease of the power demand such as to achieve a minimal recovery time for recovering the operation of the wind turbine to the normal or nominal operation, in particular including the nominal rotational speed of the rotor.

According to an embodiment of the present invention, in particular depending on a required increase of the net power output, an amount of decreasing the power demand of the wind turbine and an amount of increasing the power extraction from the rotating rotor is determined based on the recovery time information for controlling the wind turbine, in order to minimize the recovery time.

In particular, the method may involve setting up or applying a model of the operation of the wind turbine, when the power extraction is increased and when the power demand is decreased. The model may comprise a mathematical/physical/self learning model of the wind turbine, in particular the wind turbine rotor and/or the converter connected to the generator. Thereby, it may be modelled how long it may take at a given wind condition for the rotor to resume the steady state power/nominal rotational speed when the rotor has been decreased to a current rotational speed. Further, the model may indicate how much energy may effectively be extracted from the rotor by extracting additional energy from the rotor resulting in a decrease of the rotational speed. Further, the model may determine a compromise between maximizing the power extraction from the rotor and minimizing the recovery time. Thereby, an optimization problem may be solved.

Thereby, the method may be improved.

According to an embodiment of the present invention the controlling the wind turbine (involving increasing the power extraction from the rotating rotor and/or decreasing the power demand of the wind turbine) is based on a combination of the demand reduction capacity information, the inertial capacity information, spinning reserve information and the recovery time information. All these information portions may be available for different external conditions, such as wind speed, humidity, temperature, rotor blade pitch angle and so forth, utility grid voltage, utility grid frequency and so on and also required net power increase. Thereby, the controller may state, what consumption is currently taking place by what component.

According to an embodiment of the present invention the decreasing the power demand of the wind turbine from the utility grid comprises decreasing power demand of at least one electrical wind turbine device comprising at least one of: a de-icing system for de-icing a rotor blade of the wind turbine, a heating system, in particular for de-icing a rotor blade of the wind turbine, a cooling system for cooling a mechanical and/or electrical component of the wind turbine, a lighting system, a yaw motor for orienting the wind turbine relative to the wind direction, hydraulics for moving a component of the wind turbine, an uninterruptible power supply system, a pump circulating cooling liquids or cooling liquids. Other electrical wind turbine devices may be controlled regarding their energy consumption while performing the method.

All these electrical wind turbine devices may be switched on and/or off or at least may be operated in order to decrease their energy consumption. Thereby, these electrical wind turbine devices may be individually controlled, wherein each particular device may have operational information indicating during which external conditions the respective wind turbine device may be essential or how this device has to be operated in the different external conditions, in order to provide an energy producing wind turbine operation. Thereby, the power demand may be decreased individually for each of the wind turbine devices adapted to the current external conditions. Thereby, the operation of the wind turbine may be ensured to allow energy production, while minimizing the power demand of the wind turbine from the utility grid.

The turbine controller may continuously monitor the active state on/off and may all the time re-calculate how much energy demand may be reduced at this given instance. This value may be accumulated or stored by the plant controller.

According to an embodiment of the present invention the method further comprises supplying a control signal to a converter connected to a generator of the wind turbine causing the converter to increase a torque exerted on the rotating rotor to increase the power extraction from a rotating rotor. The control signal may involve one or more pulse width modulation signals supplied to one or more gates of one or more controllable switches, such as isolated gate bipolar transistors (IGBT) comprised in the converter. By using a converter and supplying a respective control signal to the converter the method may be simplified.

According to an embodiment of the present invention the control method is adapted for controlling a plurality of wind turbines. In particular, the method may be performed by a wind park controller. In particular, the wind park controller may individually control the individual wind turbines especially adapted with respect to the respected constitution of the wind turbine. Controlling to set the best combination of demand response-inertial response and spinning reserve for each individual turbine may contribute to meet the aggregate grid requirement for fast under frequency response.

It should be noted that features individually or in any combination disclosed, described, mentioned, explained or employed for a method for controlling a wind turbine may also be applied to an arrangement for controlling a wind turbine according to an embodiment of the present invention and vice versa.

According to an embodiment it is provided an arrangement for controlling a wind turbine, in particular in case of a frequency drop in a utility grid to which the wind turbine is connected, the arrangement being adapted: to increase power extraction from a rotating rotor of the wind turbine, thereby decreasing a rotational speed of the rotor, in particular from a nominal rotational speed; and simultaneously to decrease a power demand of the wind turbine from the utility grid, in particular from a nominal power demand, thereby increasing a net power output of the wind turbine to the utility grid.

The arrangement may be adapted to perform a method according to an embodiment of the present invention.

According to an embodiment of the present invention the arrangement further comprises a converter connected to the generator and adapted to cause the generator to increase a torque acting on the rotor in order to increase the power extraction; a power supply system adapted for controlling a power supply from the utility grid to a wind turbine electrical component, in order to decrease a power demand of the wind turbine. Thereby, the turbine exports an amount of power derived as power produced minus power consumed (by wind turbine components). Thus, only when the turbine is not producing any power there is power pulled from the utility grid to operate the wind turbine components.

The converter may be a AC-DC-AC converter comprising a AC-DC section, a DC-link, and a DC-AC section, wherein the AC-DC section and the DC-AC section each may comprise one or more controllable switches, such as IGBTs, in particular each comprising six IGBTs.

The power supply system may comprise one or more switches in order to individually switch on and off power supply to one or more wind turbine devices. Further, the power supply system may be adapted to adjust a power consumption of the one or more wind turbine electrical devices.

The present invention is now described with reference to the accompanying drawings. The invention is not limited to the described or illustrated embodiments.

DETAILED DESCRIPTION

Figure 1:
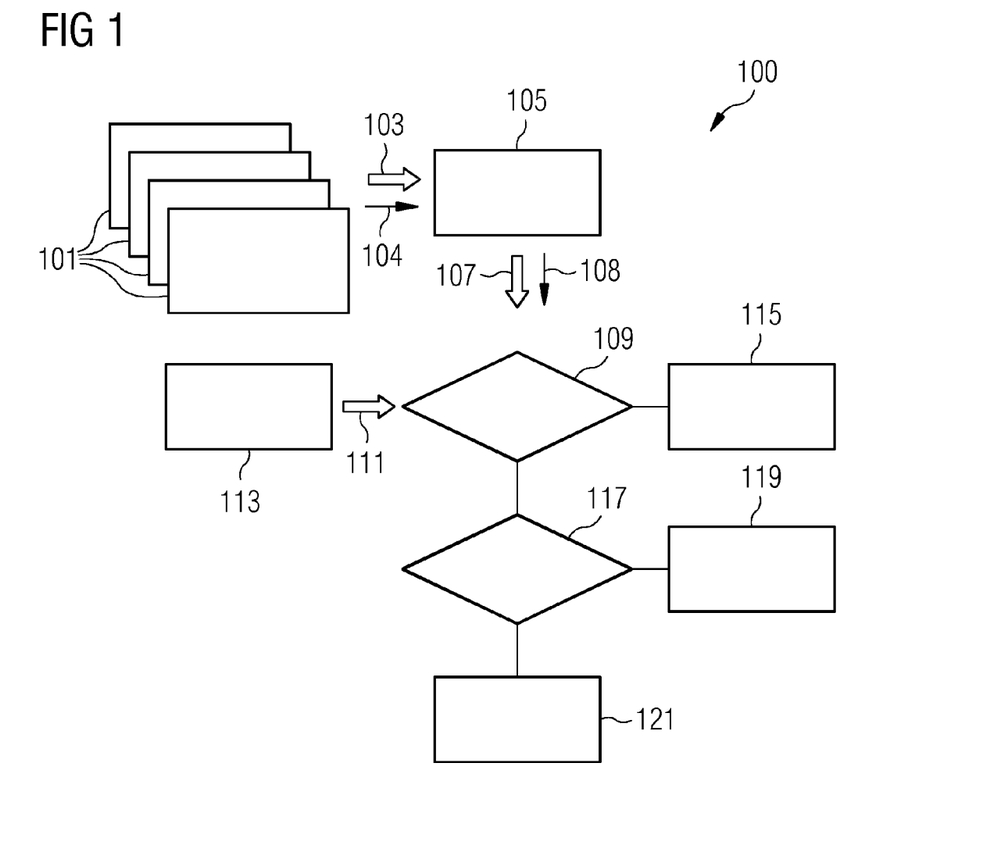
FIG. 1 schematically illustrates a flow diagram of a method for controlling a wind turbine according to an embodiment of the present invention.

FIG. 1 illustrates a flow diagram of a method 100 for controlling a wind turbine according to an embodiment of the present invention. Thereby, a number of wind turbines 101 are providing information 103 regarding a demand reduction capacity indicative of the maximal decrease of the power demand. Further, the individual wind turbines 101 provide each an inertial capacity information 104 to the controller 105.

The information 103, i.e. the plural demand reduction capacity information of each turbine 101 is provided to a controller 105 which may receive the particular demand capacities 103 and the particular inertial capacities 104 in order to obtain a sum of demand capacities 107 and a sum of inertial capacities 108 which are then provided to a decision block 109.

The decision block 109 further receives a command 111 which defines a required amount 113 as to how much increase the net power output of the plural wind turbines. In the decision block 109 it is tested, whether the sum of the demand reduction capacity (sum(P_demand)) is larger than the required amount (P_required) of the additional power required or needed. If the sum of the demand reduction capacity (sum (P_demand)) is larger than the required power increase (P_required), then it is branched to the method step 115, in which the power demand of one or more wind turbines is decreased such as to effectively increase the net power output of the wind turbine being equal to the required power P_required.

If the sum of the demand reduction capacity (sum (P_demand)) is not greater than the required additional power (P_required), it is branched to a method step 117 in which it is tested whether the sum of the demand reduction capacity (sum (P_demand)) and the sum of the inertial capacity (sum (P_inertial)) is larger than the required additional power P_required. If this is the case, it is branched to the method step 119, in which the power demand of one or more of the wind turbine is decreased and in which further the power extraction from one or more rotating rotors of one or more wind turbines is increased, in order to need the required additional power P_required.

If on the other hand this is not the case, it is branched to the method step 121, in which additionally to the measures taken in the method step 119 a spinning reserve of one or more of the wind turbines is exploited which allows extracting additional power from the rotating rotor of one or more of the wind turbines which rotating rotor rotates at a rotational speed greater than the nominal speed.

This logic may also be used to set the spinning reserve reference dynamically, so that only the required amount of spinning reserve is available at any given time.

Further, a not illustrated arrangement for controlling one or more wind turbines 101, in particular in case of a frequency drop in a utility grid to which the wind turbine is connected, may perform the method 100 according to an embodiment of the present invention.

Figure 2:
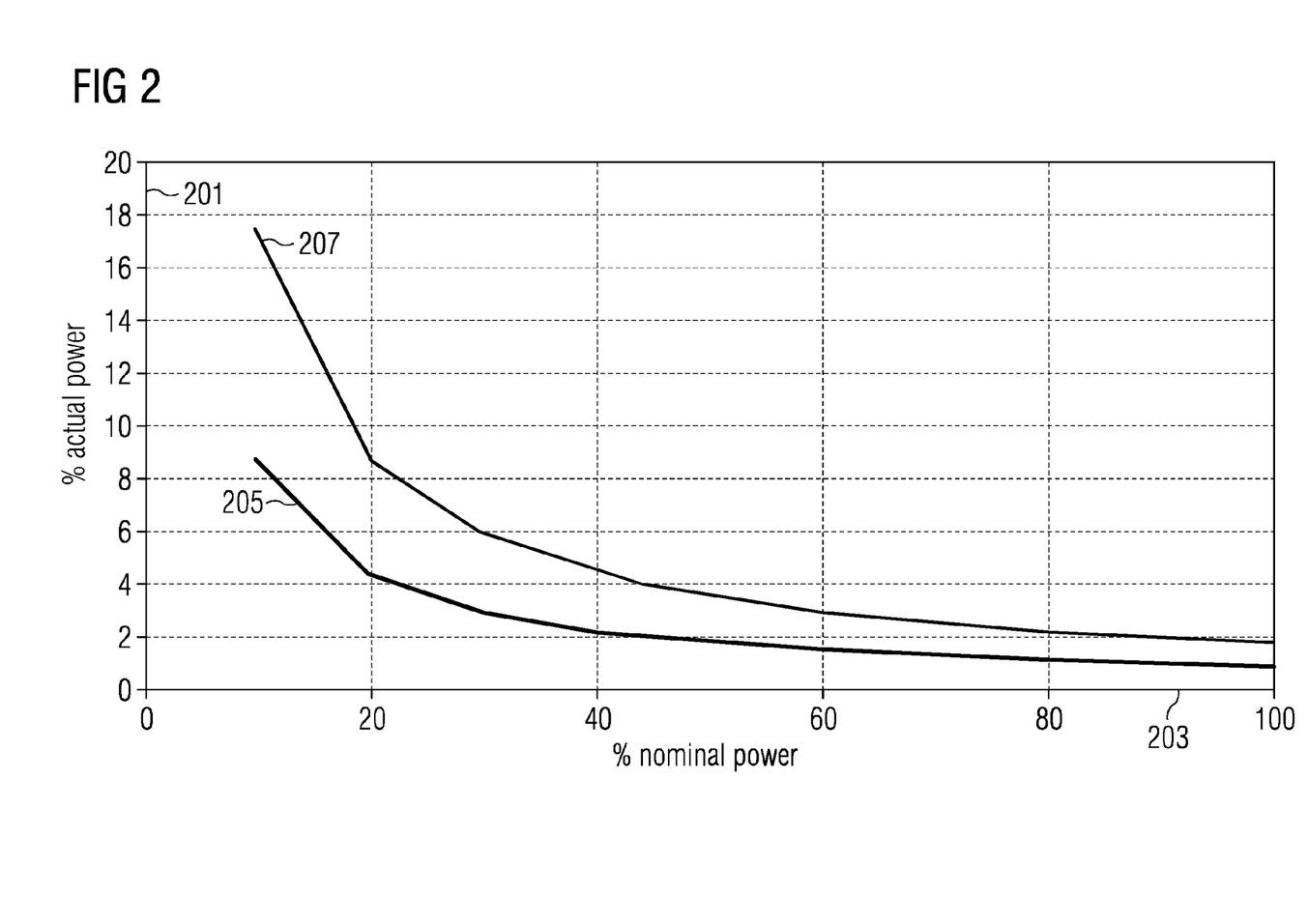
FIG. 2 illustrates a graph considered in a method according to an embodiment of the present invention.

FIG. 2 illustrates a graph, wherein on an ordinate 201 the percentage of the power relative to the actual power is indicated, while on the abscissa 203 the power in percent of the nominal power is indicated. The curve 205 indicates the demand reduction capacity of a single wind turbine having a particular number of electrical devices supplied with electric energy and the curve 207 indicates another example of a wind turbine which has even more electrical devices which are supplied with electrical energy from the utility grid.

As can be seen from curve 205 by switching off one or more of the electrical devices above 8% of the total power produced at about 10% power output may be saved by switching off these electrical devices. The curve 207 indicates that even almost 18% of the energy can be saved by switching off the electrical devices, when the wind turbine is operated according to a power output of 10% of the nominal power output. Further, for larger power output the relative contribution of the energy which may be saved by switching off or turning down the devices of the wind turbine decreases. In particular, the demand respond in the case of curve 205 is able to contribute 9% or around 20% (curve 207) of the production level.

Figure 3:
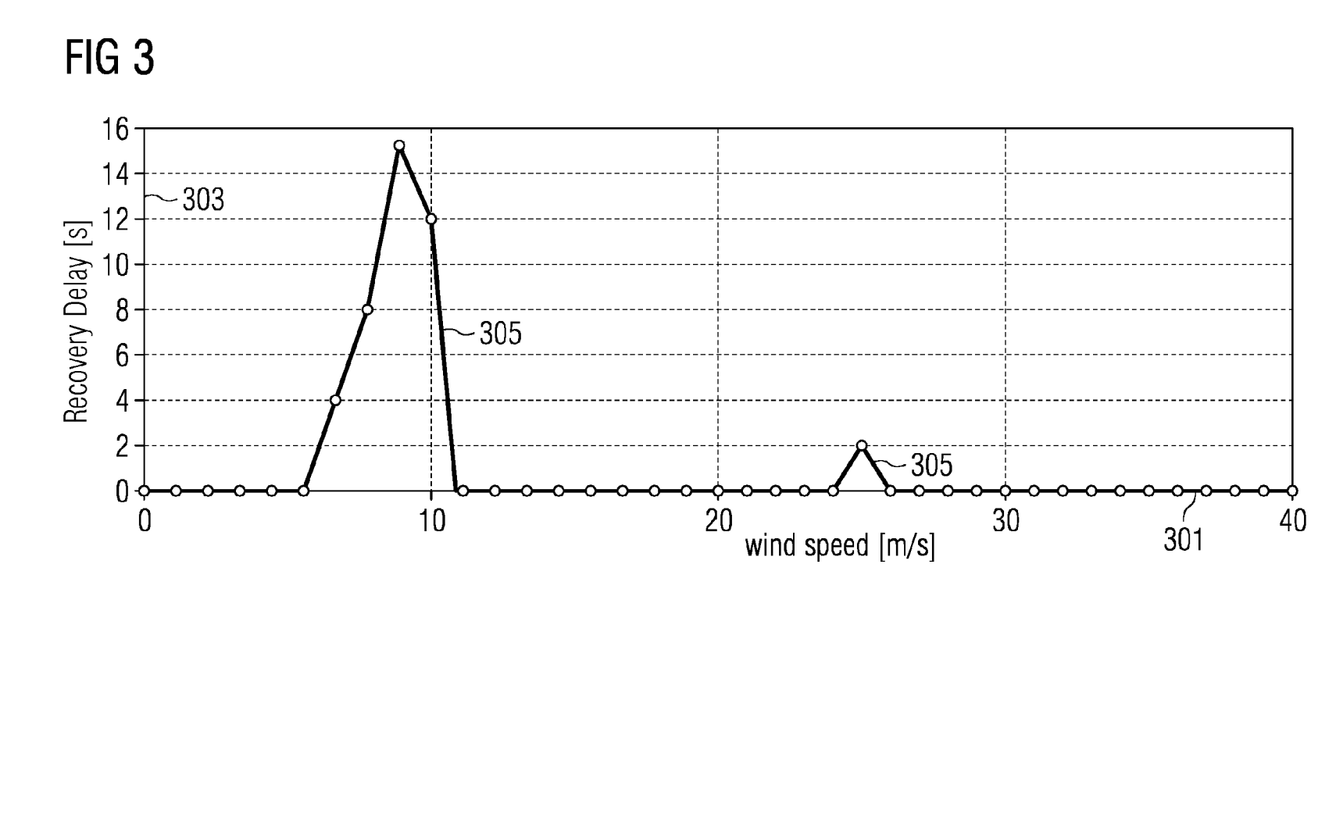
FIG. 3 illustrates a recovery delay achieved when performing a method according to an embodiment of the present invention.

FIG. 3 illustrates on an abscissa 301 a wind speed in m/s and on an ordinate 303 a recovery delay in seconds, when a method for controlling a wind turbine according to an embodiment of the present invention is performed.

As can be appreciated from FIG. 3 the recovery delay as indicated by curve 305 is zero for the wind speed range between 0 m/s and 6 m/s and increases relatively rapidly from 6 m/s to 9 m/s where a maximum is achieved. From there the recovery delay decreases to become zero at 11 m/s and for higher wind speed values between 11 m/s and 24 m/s the recovery delay stays at zero. A small increase is observed between 24 m/s and 26 m/s. Beyond 26 m/s the recovery delay stays at zero.

Figure 5:
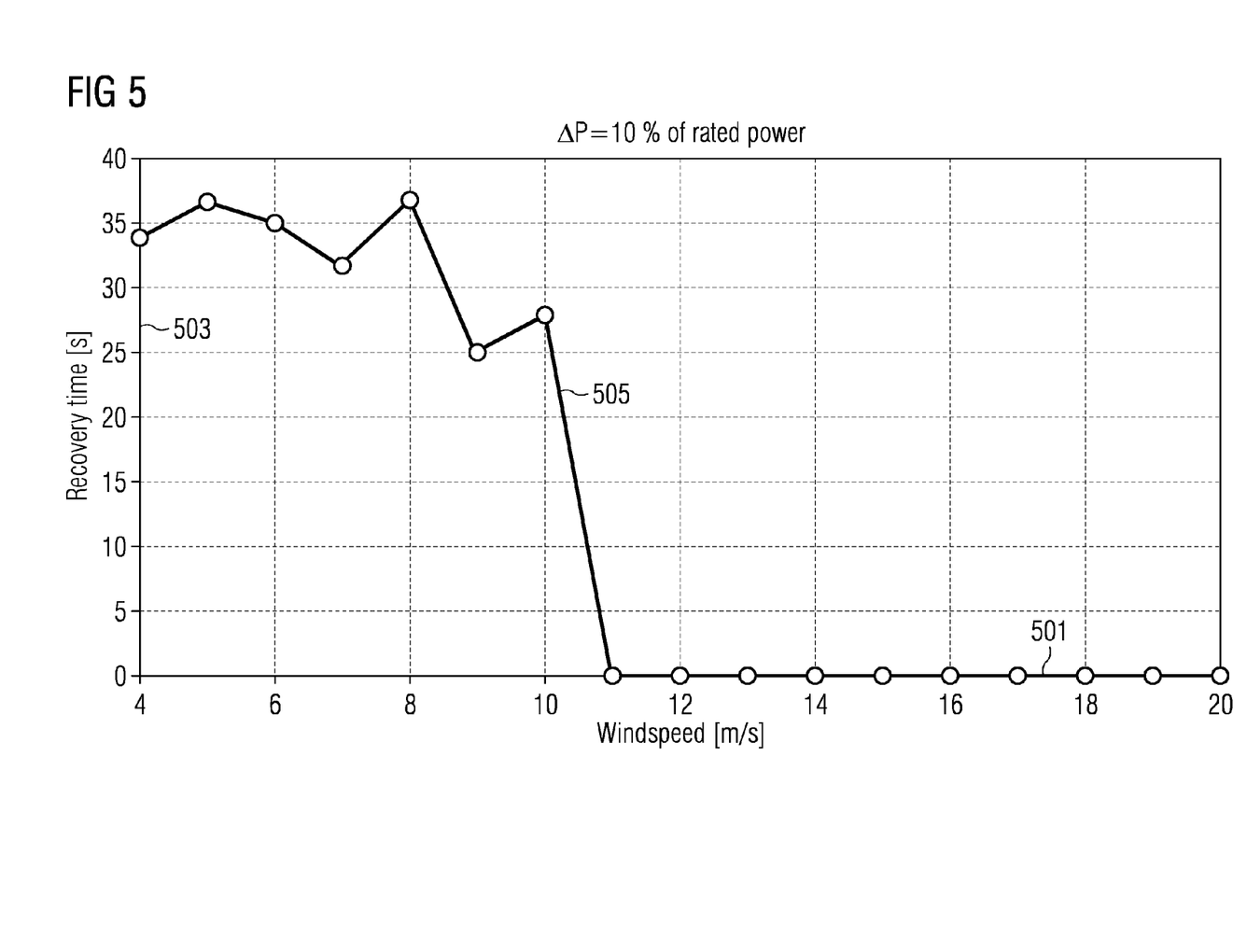
FIG. 5 illustrates a recovery time of a conventional method.

The recovery delay is in particular advantageously decreased compared to a recovery time of a conventional method, as is illustrated in FIG. 5. In particular, on the abscissa 501 of FIG. 5 the wind speed is indicated in m/s and on the ordinate 503 the recovery time is indicated in seconds.

As can be appreciated from FIG. 5, the recovery time 505 is much higher than the recovery time illustrated in FIG. 3. In particular, the recovery time 505 is above 25 s in a wind speed range between 4 m/s and 10 m/s, while the recovery time of the curve 305 according to an embodiment of the present invention is zero in this wind speed range. Further, at a wind speed of 9 m/s the recovery time of the conventional method is at about 25 m/s, while the recovery time according to an embodiment of the present invention (curve 305 of FIG. 3) is only at around 15 s.

In particular, as can be taken from FIG. 3 the recovery delay is 0 up to 6 m/s followed by a proportional increase in the recovery delay up to a wind speed for nominal production of around 11 m/s and finally a drop to again 0 response delay up to approximately 25 m/s is observed. In particular, for turbine models with a fixed high wind stop limit there will be no response delay above the nominal wind speed all the way up to 40 m/s.

For wind turbines with a high wind ramp down function there may be a small response delay around 25 m/s where the main portion of the response would have to come from the converter and not from the demand response function.

A plant controller may calculate a recovery delay indication in a numeric format what the plant operator can expect of a recovery delay at any given time for the actual operation condition for the plant. Thereby, the index may include a time and a capacity designation, such as a demand reduction capacity information and/or inertial capacity information either as a total megawatt indication or a percentage of installed capacity or a percentage of actual capacity. Further, the central controller may also aggregate value for what portion of the simulated inertial response will be performed by the demand response function and what portion will be performed by a temporarily converting additional kinetic energy and exporting it to the public utility grid, thereby distributing between demand response-inertial response and spinning reserve. Thus, the central controller may calculate the portion of the increasing the power extractor from the rotating rotor and also the portion of the decreasing the power demand of the wind turbine in order to meet the additionally required power or energy.

Further, a slight spinning reserve may be kept by one or more wind turbines. However, this may be applied only during particular wind conditions, where the recovery delay response falls outside the desired criteria.

Figure 4:
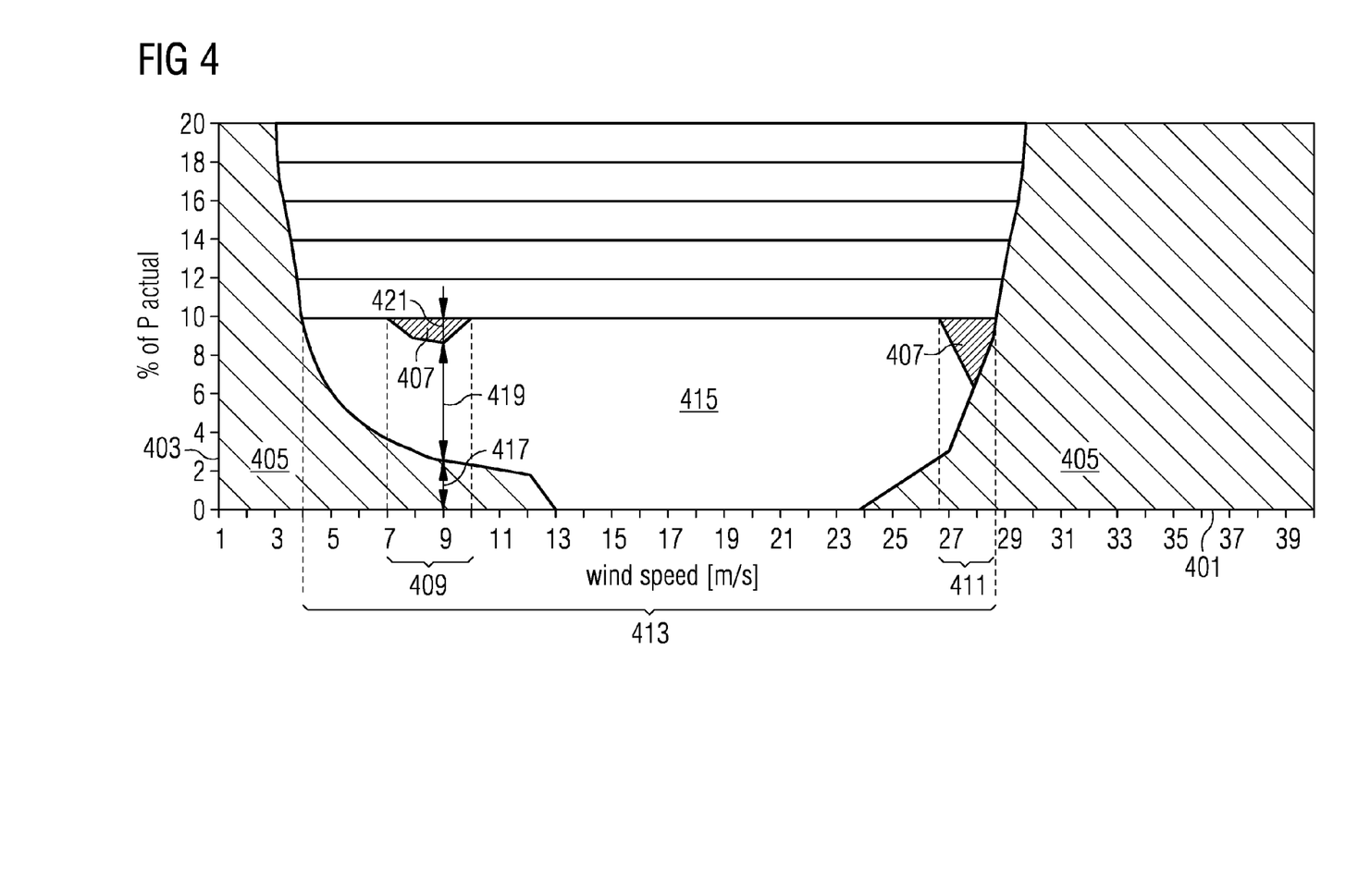
FIG. 4 illustrates a graph showing contribution of particular energy portions as considered in a method according to an embodiment of the present invention.

FIG. 4 illustrates a graph showing the different contributions for the demand reduction capacity, the inertial capacity and the spinning reserve according to an embodiment of the present invention.

An abscissa 401 indicates the wind speed in m/s, while an ordinate 403 indicates the percentage of the actual power output. In the area 405 the demand reduction capacity is indicted. As can be appreciated from FIG. 4 the demand reduction capacity is especially high at low wind, i.e. between 1 m/s and 3 m/s, wherein it decreases from 3 m/s to about 13 m/s where it reaches zero. Further, the demand reduction capacity increases from 24 m/s to very high values for higher wind speeds.

In the areas 407 the contribution of the spinning reserve is indicated. It can be appreciated that the spinning reserve is only provided in two different wind speed ranges, in particular in the range 409 ranging from about 7 m/s to 9 m/s and in the wind range 411 ranging from about 27 m/s to 29 m/s. Thus, in these wind regions the wind power plant is operated with spinning reserve (in particular the rotational speed of the rotor is increased above its nominal level) so that in case of a frequency drop or voltage drop in the utility grid the amount of spinning reserve (in particular the rotational speed) can be reduced in order to extract more energy from the rotating rotor, in order to stabilize the utility grid. Thereby, the spinning reserve may mean a rotor speed change but it may also be just a pitch change or a combination of both.

In other embodiments spinning reserve is provided across a larger wind speed range from e.g. about 4 m/s to e.g. about 29 m/s by extending the areas 407 vertically upwards in FIG. 4.

Further, in the speed range 413, i.e. in the range between about 4 m/s and 28 m/s an inertial response is available as indicated by the area 415.

For example, if the external condition corresponds to a wind speed of 9 m/s and if a grid even occurs, such as a frequency drop, the demand reduction capacity would contribute about 3% of the actual power output as indicated by the double arrow 417. Further, the inertial response would contribute about 6% as is indicated by the double arrow 419. Furthermore, the spinning reserve would contribute with about 1 to 2% as indicated by the double arrow 421. As will be understood by the skilled person at other wind speeds the relative contributions of the demand response, the inertial capacity and the spinning reserve may assume different relative values.

In a different implementation the contribution from the spinning reserve may be provided by a local turbine or a plant storage system further reducing the need for the wind turbine plant to spill power in order to provide this ancillary service of inertial response to the grid.

Inter alia it is described a method for controlling a power plant, in particular wind power plant, in particular in case of a frequency drop in a utility grid to which the turbines of the plant are connected, the method comprising: Combining demand response, inertial response and spinning reserve for given wind speeds in order for wind power plants to deliver fast aggregate under frequency response for a wide wind speed range with minimal recovery time and minimal production loss at each wind speed.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

I claim:

1. A method for controlling a wind turbine, when a frequency drop in a utility grid to which the wind turbine is connected exists, the method comprising:
   increasing power extraction from a rotating rotor of the wind turbine; and simultaneously
      decreasing a power demand of the wind turbine from a nominal power demand,
      wherein a net power output of the wind turbine to the utility grid is increased.

2. The method according to claim 1, further comprising:
   receiving a command to increase the net power output of the wind turbine by a required amount;
   determining that a maximal decrease of the power demand is smaller than the required amount;
   decreasing the power demand of the wind turbine by the maximal decrease of the power demand; and
   increasing the power extraction from the rotating rotor such that the required amount equals the increased net power output.

3. The method according to claim 1, wherein increasing the power extraction from the rotating rotor results in a decreasing a rotational speed of the rotor from a nominal rotational speed to a rotational speed lower than the nominal rotational speed.

4. The method according to claim 1, further comprising:
operating the wind turbine at a wind speed range,
extracting power from the rotating rotor to an amount being 5% to 10% below an available power extraction for the given wind speed,
receiving a command to increase the net power output of the wind turbine by a required amount,
determining that a maximal decrease of the power demand is smaller than the required amount,
decreasing the power demand of the wind turbine from the grid by the maximal decrease of the power demand, and
increasing the extracting the power from the rotating rotor such that the required amount equals the increased net power output.

5. The method according to claim 4, wherein the wind speed range is between 5 m/s and 12 m/s.

6. The method according to claim 4, wherein the wind speed range is between 23 m/s and 30 m/s.

7. The method according to claim 1,
wherein a demand reduction capacity information indicative of the maximal decrease of the power demand for an operational condition is accessed and is processed for controlling the wind turbine.

8. The method according to claim 1,
wherein an inertial capacity information indicative of a maximal increase of power extraction, between 5% and 10% of an actual power extraction, from the rotating rotor for an operational condition is accessed and is processed for controlling the wind turbine.

9. The method according to claim 3,
wherein a recovery time information about a recovery time to recover from a rotational speed loss to the nominal rotational speed, for an operational condition, is accessed and is processed for controlling the wind turbine.

10. The method according to claim 9,
wherein, depending on a required increase of the net power output, an amount of decreasing the power demand of the wind turbine and an amount of increasing the power extraction from the rotating rotor is determined based on the recovery time information for controlling the wind turbine, in order to minimize the recovery time.

11. The method according to claim 1,
wherein the controlling is based on a combination of a demand reduction capacity information, an inertial response capacity information and a recovery time information.

12. The method according to claim 1,
wherein the decreasing the power demand of the wind turbine from the utility grid, comprises decreasing power demand of an electrical wind turbine device selected from the group consisting of:
a de-icing system for de-icing a rotor blade of the wind turbine,
a heating system,
a cooling system for cooling a mechanical and/or electrical component of the wind turbine,
a lighting system,
a yaw motor for orienting the wind turbine relative to the wind direction,
hydraulics for moving a component of the wind turbine,
an uninterruptible power supply system, and
a pump circulating cooling liquids or cooling liquids.

13. The method according to claim 1, further comprising:
supplying a control signal to a converter connected to a generator of the wind turbine causing the converter to increase a torque exerted on the rotating rotor to increase the power extraction from a rotating rotor.

14. The method according to claim 1,
adapted for controlling a plurality of wind turbines.

15. An arrangement for controlling a wind turbine when a frequency drop in a utility grid to which the wind turbine is connected occurs, the arrangement being adapted:
to increase power extraction from a rotating rotor of the wind turbine, and simultaneously, and
to decrease a power demand of the wind turbine from a nominal power demand,
thereby increasing a net power output of the wind turbine to the utility grid.

16. The arrangement according to claim 15, further comprising:
a converter connected to a generator and adapted to cause the generator to increase a torque acting on the rotor in order to increase the power extraction, and
a power supply system adapted for controlling a power supply from the utility grid to a wind turbine electrical component, in order to decrease a power demand of the wind turbine.

17. The arrangement according to claim 15, which is adapted for controlling a wind turbine:
to perform a function for automatically establishing the needed level of spinning reserve for each individual wind turbine in order to deliver the specified fast frequency response during under frequency events for the given wind conditions at the wind power plant.

* * * * *